United States Patent [19]

Vetter

[11] 3,822,514
[45] July 9, 1974

[54] APPARATUS FOR THE FINE BALANCING OF GRINDING WHEELS

[75] Inventor: Ulrich Vetter, Stuttgart-Heumaden, Germany

[73] Assignee: Schaudt Maschinenbau, GmbH, Stuttgart, Germany

[22] Filed: July 26, 1972

[21] Appl. No.: 275,243

[30] Foreign Application Priority Data
July 29, 1971  Germany............................ 2137901

[52] U.S. Cl. .................................................. 51/169
[51] Int. Cl. ....................... F16f 15/00, B24b 45/00
[58] Field of Search ......................... 51/169; 74/573

[56] References Cited
UNITED STATES PATENTS

| | | | |
|---|---|---|---|
| 2,241,637 | 5/1941 | Ernst................. | 51/169 X |
| 2,882,745 | 4/1959 | Comstock......................... | 51/169 X |
| 3,339,430 | 9/1967 | Klein.................................. | 51/169 X |
| 3,371,450 | 3/1968 | Board ............................... | 51/169 |
| 3,698,263 | 10/1972 | Ito...................................... | 74/573 |
| 3,702,082 | 11/1972 | Decker ............................ | 51/169 X |

FOREIGN PATENTS OR APPLICATIONS

| | | | |
|---|---|---|---|
| 1,272,585 | 7/1968 | Germany .............................. | 51/169 |
| 1,106,901 | 3/1968 | Great Britain....................... | 51/169 |

*Primary Examiner*—Donald G. Kelly
*Attorney, Agent, or Firm*—Bruce & McCoy

[57] ABSTRACT

Apparatus for the fine balancing of a grinding wheel comprising two balance masses adjustable jointly in one angular direction and a third balance mass adjustable in the opposite direction all located in a housing which is adjustably rotatable relative to the wheel, the masses being arranged on a common balance shaft rotatable relative to the wheel and to the housing, the housing carrying a pinion meshing with a bevel wheel rotatable with the third mass and with a bevel wheel rotatable with one of the adjustable masses, whereby adjustment of the first two masses causes counter adjustment of the third mass. Two further balance masses may be secured in the housing, the pinion being mounted in one of these. All the masses are preferably semi-circular in cross section. The balance shaft extends through an inner hollow shaft which carries the housing and which in turn extends inside the hollow grinding wheel spindle, control means for adjusting the masses being located at one end of the balance shaft and inner hollow shaft. The control means includes sun and planet gearing interconnecting the balance shaft inner hollow shaft and spindle and adjusting rings connected through disengagable couplings with an adjusting motor. The control may be arranged for operation manually or through electrical circuits, and several forms of electrical control are described as well as electrical means for indicating the degree of imbalance and the compensation movements of the masses.

14 Claims, 9 Drawing Figures

APPARATUS FOR THE FINE BALANCING OF GRINDING WHEELS

The invention relates to an apparatus for the fine balancing of grinding wheels which consists of two balance masses adjustable jointly in one direction which masses are arranged on both sides of a third balance mass in a housing rotatable relative to the grinding wheel which is adjustable counter rotating and has the balance moment.

In an earlier apparatus of this type the balance masses were designed as planet wheels which meshed with inner teeth of the housing. For the manufacture of such an apparatus it is therefore necessary to provide all balance masses and the inside of the housing with teeth whereby the manufacture is rendered expensive.

By means of the invention therefore an apparatus of this kind is made available which is to be produced with small expenditure and this problem is solved according to the invention in that all balance masses are disposed on a shaft rotatable jointly relative to the grinding wheel and to the housing, and in the housing at least one pinion is rotatably mounted which meshes with a bevel gear on the third balance mass and a bevel gear on one of the two jointly adjustable balance masses, whereby one of the two bevel gears and the corresponding balance mass is connected rotationally fixed to the shaft and the other bevel gear is mounted with the corresponding balance mass rotatably on the shaft. With an apparatus thus designed only a few small constructional parts with teeth need to be made so that the manufacture is substantially simplified.

The pinion with its bearing in the housing presents of course a certain imbalance which must be compensated. Instead of this the pinion mass however may also be applied as a balance mass for the compensation of the imbalance and for this according to a further development of the invention the pinion is mounted in a fourth balance mass connected to the housing whereby for the compensation of the dynamic imbalance possibly resulting thereby there is provided on the other side of the third balance mass suitably a fifth balance mass the balance moment of which is equal to that of the fourth balance mass and the balance moment of the pinion. If in this way a part of the balance mass is determined in the housing the masses of the adjustable balance masses may be selected correspondingly less so that the adjustment of the balance masses for the compensation of a certain imbalance of the grinding wheel is considerably more sensitive. Optimumly the masses of the movable balance masses and the fixed balance masses are selective relative to one another such that the balance moment of the fourth and fifth balance mass together with the balance moment of the pinion is equal to the balance moment of the first three blanace masses.

In the known balancing apparatus and also with the apparatus according to the earlier proposal, the balance masses are made substantially with circular cross section so that the inner diameter of the housing must be at least equal to twice the diameter of the balance masses. If on the other hand according to a further development of the invention the balance masses are given substantially a semi-circular cross section, then the outer diameter of the housing may be reduced or with the same outer diameter the magnitude of the balance moment of each balance mass may be considerably increased.

With given dimensions the magnitude of the balance moment of each balance mass may be still further increased in that the balance masses are made from a sintered hard metal of a high specific weight instead of making them in the usual manner from steel.

It is already known to design the grinding wheel spindle as a hollow shaft so that the control devices for the adjustment of the balance masses may be disposed on the end of the spindle remote from the grinding wheel, that is on the driving side. The apparatus according to the invention is especially well suited for the purpose. It requires that the housing be rotated on a hollow shaft, which hollow shaft extends through the spindle beyond the spindle drive. The balance shaft on which the masses are disposed is, then, arranged in the hollow shaft with the end of the balance shaft extending beyond the end of the hollow shaft.

Then at the ends of the hollow shaft and the shaft balancing control devices for the adjustment of the balance masses may be provided. The advantage of this arrangement consists in that with manual operation of the control devices the operator may remain outside the area of the grinding wheel so that the danger of accident is considerably reduced.

Different controls devices are considered with which the hollow shaft and the shaft can be rotated relatively to one another and to the grinding wheel spindle. One example is an apparatus as used in a balancing device which for building into the grinding wheel and the grinding wheel side adjustment of the balance masses is supplied by the firm of Hartex GmbH, Berlin-marienfelde, and described in the German specification laid open to inspection No. 1,135,207. The balance masses are in this known balancing apparatus designed and arranged basically otherwise than in the subject matter of the application but the control device consists of outer teeth or the spindle, a hollow shaft and a shaft lying therein and these outer teeth mesh with groups of planet wheels of a freely rotatable planet cage which in turn are in engagement with adjusting rings. One of these adjusting rings namely the one in engagement with the group of planet wheels which meshes with the outer teeth on the spindle is designed as an operating cap.

With this known control device the operating cap takes constantly with the grinding wheel and would therefore with the subject matter of the application likewise rotate constantly with the spindle and must, before commencement of the balancing, be braked and firmly held by hand. Both high speeds of rotation of grinding wheel spindles should obviate the contact of rotating parts with the hand in every case and with the use of this known control device in the subject matter of the application therefore the coupling secured against rotation is provided which cooperates with a coupling part on the corresponding adjusting ring and which is actuated as soon as a protective hood turning off the control device is opened. By "coupling" in this connection is meant to be understood any device with which two constructional parts rotatable freely against one another remain rotatable as desired freely against one another or are connected rotationally fixed to one another. In this sense for example brakes also come under the term coupling. Basically as coupling or brake any suitable construction comes into consideration resulting in a particularly simple and reliable construction when according to a special design of the invention the coupling is an electronically actuated coupling in the excitation circuit of which there is a switch closes which upon opening the protective hood. In many cases however it is desirable to operate the control device remotely and in order to facilitate that according to a special design of the invention, associated with the two other adjusting rings is an electronically actuated coupling which co-operates with a coupling part on the adjusting ring which is rotatable when the coupling is excited relative to this via a pinion which is capable of being driven by an adjusting motor. Couplings are in this design of the invention stationary so that to these as also the adjusting motor excitation current can be directly fed if that is required during the balancing procedure. The balancing procedure as such runs with this remotely actuated structural form exactly as with the manually operated one, only that the relative adjustments between the adjusting ring associated with the spindle and the adjusting ring rotatable with the pinion is effected in such a manner that this latter adjusting ring is firmly braked and the first together with the other adjusting ring is rotated whilst with the manual adjustment of this adjusting ring is rotated on further firmly braked first adjusting ring.

Another possibility for the remote operation of the control device is according to another construction of the invention, attained when the control device consists of two couplings which in the coupled state couple the hollow shaft to the spindle and the shaft to the hollow spindle and an adjusting motor which can drive the shaft. In this constructional form the couplings and the adjusting motor run in normal operation of course at the speed of rotation of the spindle and the current supplies for the couplings and the adjusting motor must therefore be brought about via slip rings. The use of slip rings present a certain rawback, this is however made up for by the substantially simpler construction and the lesser number of constructional elements as well as due to the fact that as couplings in this constructional form couplings usual in the trade can be used which is not the case with the previously described constructional form.

For indication of the imbalance vibration receivers are placed on the machine and when the current supplied by the oscillation receiver has attained a minimum value the imbalance compensating procedure concerned is concluded. In order to exclude disturbances due to vibrations which are produced by vibrations brought about other than by the imbalance, it is necessary to filter out from the current from the oscillation receiver only the components which correspond to the speed of rotation of the grinding wheel spindle. Before this mechanical or electrical filters are used, then the spindle during the compensation procedure must have exactly the speed which is given by the filter so that only with this speed can balancing be commenced.

Another method for determining the imbalance is however also known which consists of the current from the oscillation receiver being compensated in a phase-sensitive detector circuit with alternating current being supplied from a generator coupled to the grinding wheel spindle whereby for moving ambiguities and angle errors measurement is additionally made with phase displacement by 90° ambiguities and angle errors may be avoided by coupling of the generator with the balancing apparatus, but of course the measurement with phase displacement may be omitted.

In practice, as a phase sensitive detector circuit a multiplication and integration circuit is used in which the voltage from the oscillation receiver is multiplied with two alternating voltage components phase-displaced by 90° from the generator and the products are integrated. A circuit similar in function is already known; it is designated as "watt meter method". In this usual watt meter method the voltage components phase-displaced by 90° are fed from the generator one after the other to a single multiplication and integration circuits to which the two voltage components are fed simultaneously and to add vectorially the output signals of these two circuits.

This possibility of balancing with any desired spindle speed is practically necessary when balancing is to be effected automatically and according to a special design of the invention. Therefore for indication of the imbalance an oscillation receiver, a generator for producing an alternating voltage corresponding to the speed of the spindle and the phase-sensitive detector circuit are provided and this latter is connected to an automatic control means. The phase-sensitive detector circuit itself may be a usual watt meter like circuit with 90° phase displacer or also electronic detector circuits may be provided.

An automatic control means for the fine balancing of grinding wheels is known. An essential constituent part of this known control means is a programmed step by step mechanism. Such an automatic control means is substantially liable to disturbance. According to a further design of the invention therefore the automatic control means is built up from elements of the modern digital technology acting in such a manner that the automatic control means is a comparison stage in which the output signal of the detector circuit representing the residual imbalance is compensated with a nominal value and which supplies a switch-on signal for the adjusting motor and at least one of the couplings so long as the output signal is greater than the nominal value and has a differentiating stage in which a signal corresponding in sign and magnitude of the change of the detector output signal, that is, of the imbalance is produced and to which a bistable switch circuit is connected which positive change ratio reverses the direction of rotation of the adjusting motor. With the construction of such an automatic control relatively few elements suffice which to a large extent are already used and technically developed in the numerical control of machine tools, so that the control can be very simply constructed.

With the apparatus according to the invention it is usual that the common centre of gravity of the balance masses is first to adjusted such that the imbalance of the grinding wheel is exactly opposite and then the radial position of this centre of gravity is varied until the imbalance of the grinding wheel is compensated. This transition from the adjustment to the angle position of the common centre of gravity of the balance masses for the varying only of the radial position of same may be attained in different ways as has been proved particularly favourable in the differentiating stage to connect with a zero discriminator which with a variation ratio zero of the detector output signal delivers a signal with which via a bistable circuit the coupling engaged by the switch-on signal from the comparison stage is switched off and another coupling is switched on.

The resetting of the bistable switch circuit of the second coupling may then for example be effected in that the switch-on signal from the comparison stage is omitted. The particular simple possibility consists however in that the comparison stage of the quality of the detector output signal with the nominal value a signal opposite to the switch-on signal is supplied to the bistable circuit so that each coupling switched on is again switched off. Then no output signal need be prepared in an intermediate stage so that in this way operation can be effected with a minimum of switch circuits and stages.

The invention will be described by way of example in some embodiments in more detail with reference to the drawings in which.

Figure 1:
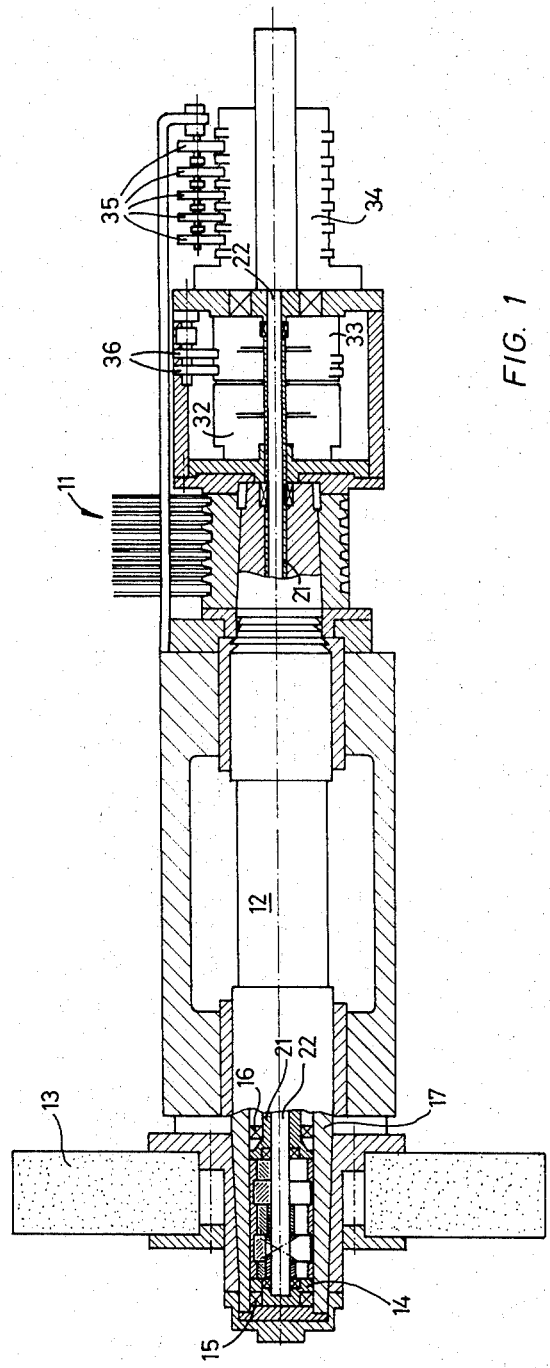
FIG. 1 shows a longitudinal section through a grinding spindle shaft with a fine balancing device according to the invention.
Figure 6:
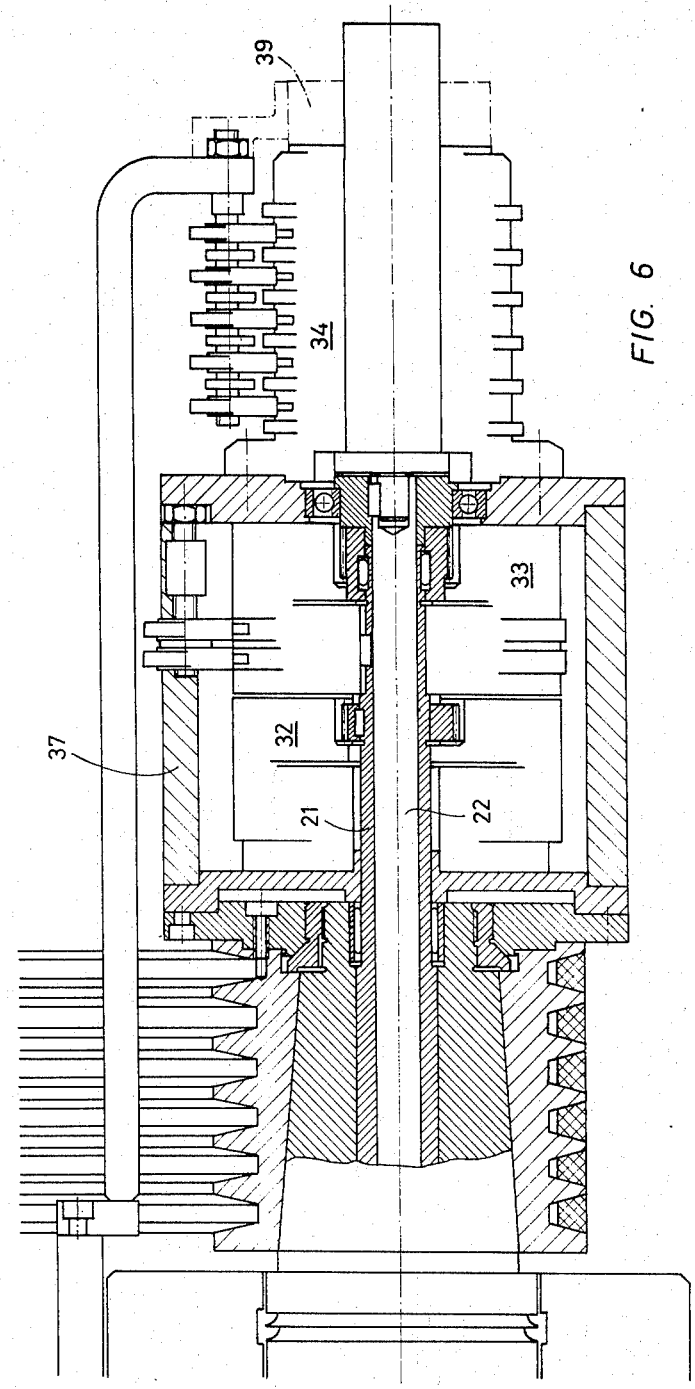
FIG. 6 shows a section through the operating part of the fine balancing device.

The grinding spindle shaft illustrated in FIG. 1 consists of a driving motor (not shown) which via vee belt 11 drives the grinding spindle 12, a grinding wheel 13 placed in the usual way on the spindle as well as a fine balancing device which consists of a mechanical part arranged in the hub of the grinding wheel 13 and a control part, illustrated in more detail in FIG. 6, which is flange connected from this on the side of the spindle 12 remote from the grinding wheel.

The mechanical part of the fine balancing device consists (see also FIG. 2) of a housing 14 which is rotatably mounted with bearings 15 and 16 in the spindle cone 17. In the housing 14 two semi-circular balance masses 18 and 19 are fixed for example with screws such as 20 (FIG. 4) and the housing 14 itself is connected to a hollow shaft 21 in which it can be rotated relative to the spindle cone 17 and thereby to the grinding wheel 13.

Figure 3:
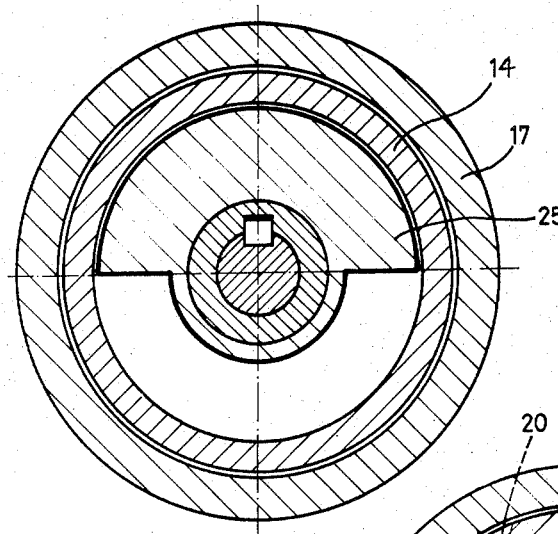
FIG. 3 shows a section along the line from III—III of FIG. 2.
Figure 5:
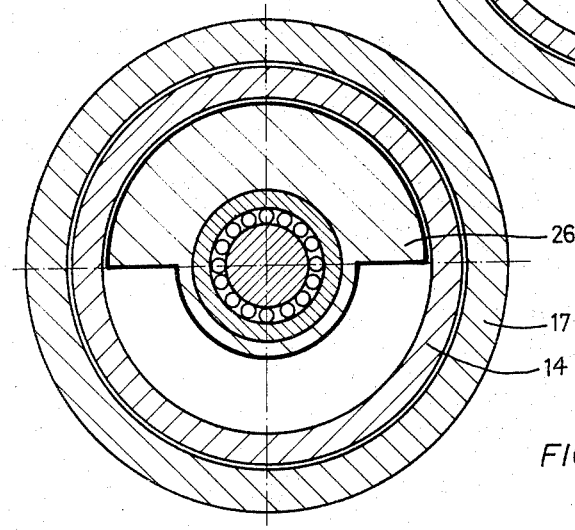
FIG. 5 shows a section along the line from V—V of FIG. 2.

In the housing shaft 21 there is rotatably arranged a solid shaft 22 which is mounted rotatably in the housing 14 with two bearings 23 and 24 and bears three balance masses 25, 26 and 27 rotatable relative to the housing 14. These three balance masses also are formed semi-cylindrically but can be best seen in FIGS. 3 and 5.

The balance masses 25 and 27 which are disposed symmetrically to the balance mass 26 (FIG. 2) are keyed to the shaft 22 and therefore rotate as soon as the shaft 22 is rotated relative to the hollow shaft 21 and thereby to the housing 14.

Figure 2:
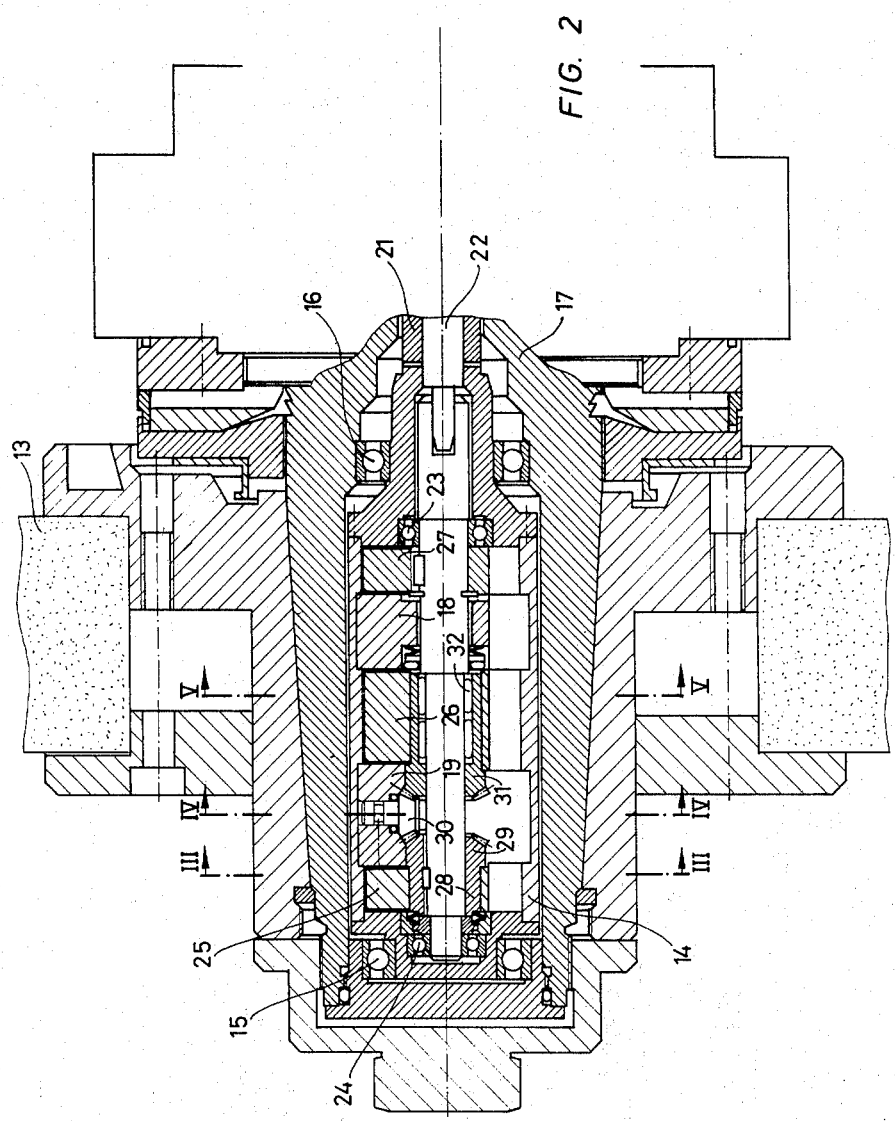
FIG. 2 shows a section through the grinding wheel receiver with the mechanical part of the fine balancing device.
Figure 4:
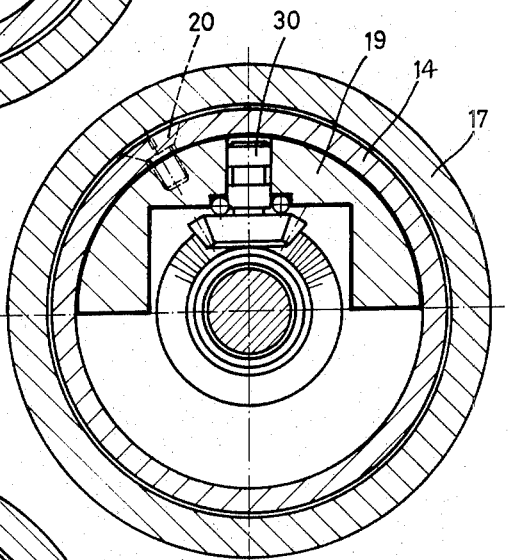
FIG. 4 shows a section along the line from IV—IV of FIG. 2.

The balance mass 25 is located on a bush 28 which is formed on its side pointing to the grinding wheel as a bevel gear 29 and there meshes with a pinion 30 which is mounted rotatably in the balance mass 19 fixed on the housing (see FIGS. 2 and 4). The pinion 30 meshes in its turn with a bevel gear 31 which is mounted rotatably on the shaft 22 with a needle bearing 32 and carries the balance mass 26. If therefore the shaft 22 rotates relative to the housing 14 then the balance masses 25 and 27 are rotated in the same direction, the bevel gear 29 rotates the pinion 30 and this rotates the bevel gear 31 and thereby the balance mass 26 in the opposite direction but by equal angle amounts.

In the position of the balance masses 18, 19, 25, 26 and 27 shown a maximum balance moment of the balancing apparatus results because the centres of gravity of all five balance masses lie in a line. Now the balance masses 25, 26 and 27 are turned in contradirection from the connecting line of the centre of gravity of the balance masses 18 and 19 then the centre of gravity of the two balance masses 25 and 27 are displaced in a direction of an arc of a circle from the centre of gravity of the balance masses 18 and 19 fixed in the housing and the centre of gravity of the balance mass 26 by the same amount in the opposite direction. The common centre of gravity of the balance masses 25, 26 and 27 thereby moves by a distance corresponding to a minus cosine of the angle of rotation $(1-\cos \alpha)$ on the axis of the shaft 22 so that the common centre of gravity of all five balance masses are displaced by half of this value. It is taken for granted that the balance moment of the masses 18 and 19 fixed in the housing is equal to the balance moment of the three movable masses and again the balance moment of the two balance masses 25 and 27 rotatable together in one direction is equal to the balance moment of the counter-rotating moving balance mass 26. If other mass ratios are selected, the ratios vary correspondingly. If the balance moment of the stationary masses is not equal to that of the movable masses in the extreme position shown in FIG. 2, the amount varies by which the total centre of gravity, which is decisive for the balance moment, moves out of the extreme position; if the ratio of the two masses 25 and 27 to the mass 26 is varied, then the centre of gravity no longer moves directly to the axis of the shaft 22, but in another direction, whicg may of course be compensated by varying the transmission by the pinion 30 made by choice of different tooth numbers.

If the movable balance masses are turned from the position shown in FIG. 2 into a position displaced by 180° so that the centres of gravity of the movable balance masses 25, 26 and 27 again lie in a line, then the whole balance moment of the device is zero insofar of course as the three movable balance masses together produce the same balance moment as the two fixed masses 18 and 19.

The hollow shaft 21 with the solid shaft 22 located therein loads through the spindle 12 via the vee belt drive; as can be seen particularly clearly in FIG. 6 the end of the solid shaft 22 also projects beyond the end of the hollow shaft 21. The hollow shaft 21 is coupled via a coupling 32 to the spindle 12 and via a coupling 33 to the solid shaft 22. The solid shaft 22 is in its turn connected rotationally fixed to the shaft stump of an electric motor 34 which is supplied with current via stationary brushes 35. The two couplings 32 and 33 are electromagnetic couplings which may be supplied with current via connections 36 rotating with the spindle.

In normal operation of the grinding machine the couplings 32 and 33 are engaged so that they themselves as also the motor 34 rotate with the spindle 12. If the coupling 32 is released by a signal via the terminal 36, then by means of current supply to the motor 34, which by means of its connection to the coupling housing 37 also rotates at the spindle speed, the solid shaft 22 and the hollow shaft 21 coupled rigidly thereto via the coupling 33 are rotated relative to the spindle 12, so that all five balance masses are pivoted out of the position shown in FIG. 2. As with the hollow shaft 21 also the housing 14 is rotated and thereby the balance masses 18 and 19. This rotation is continued until the balance moment of the balancing device according to the invention is exactly opposite the imbalance of the grinding wheel 13 as occurs also with the known and proposed balancing devices respectively.

If the coupling 32 is again coupled and therefore the coupling 33 released, then upon rotation of the motor 4 the solid shaft 22 turns opposite the spindle and the hollow shaft 21, so that only the movable balance masses 25, 26 and 27 are turned opposite the balance masses 18 and 19 stationary in the housing, so that their balance moment in the manner described is partly compensated until the balance moment of the grinding wheel 13 is also compensated by the magnitude of the balance moment of the balancing apparatus, as likewise is the case with the known and proposed balancing devices respectively. As soon as this point is reached, the coupling 33 is again coupled and the motor 34 switched off, so that the two shafts 21 and 22 and thereby the balancing device remains relative to the spindle 12.

Care should be taken that the balancing forces engaging the balance masses neither during the adjusting procedure nor in the resting state have a reaction on the control members namely the two couplings 32 and 33 and the motor 34, so that these control elements have to bring about only extraordinarily small torques and therefore can be made extraordinarily light.

Figure 7:
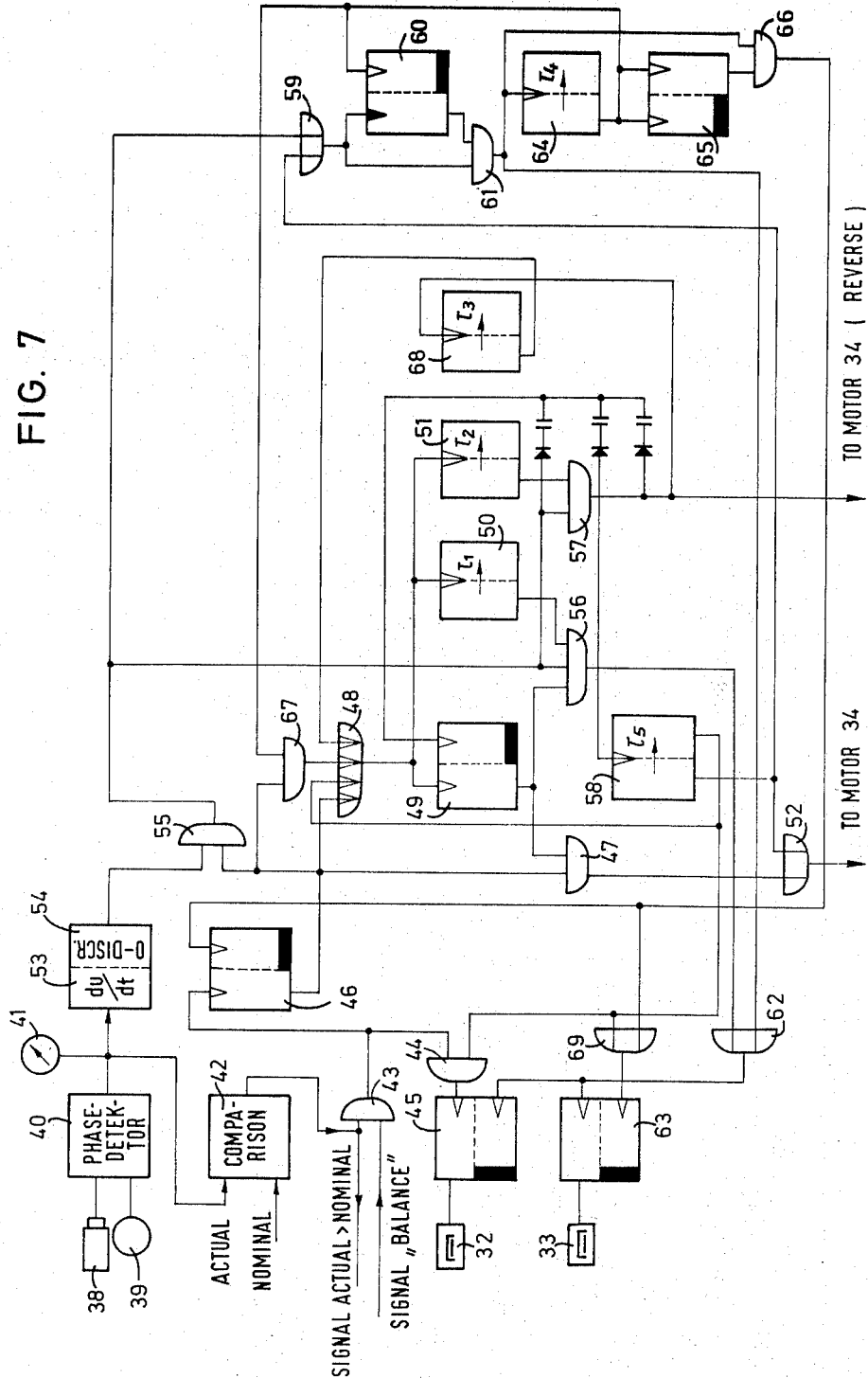
FIG. 7 shows a block diagram for the automatic fine balancing with the fine balancing device according to the invention.

With the balancing device according to the invention that has been described hitherto, it is a mechanical part in the grinding wheel hub and a control part controllable from outside of two couplings and a drive, in the form shown, two electromagnetic couplings and an electric motor, it is in the very simple manner possible to alternate the balancing procedure and a circuit suitable for this is shown in FIG. 7. On the grinding machine in usual manner an oscillation receiver 38 is mounted at a suitable place and furthermore on the end of the shaft of the motor 34 remote from the shaft 22 a rotation indicator 39 is provided, which is shown only in dot and dash line in FIG. 6; this rotation indicator may of course be applied at any other suitable place.

The signals from the oscillation receiver 38 and rotation indicator 39 are fed to a phase-sensitive detector 40 in which according to the known watt meter method the two signals are detected electromagnetically or electrically. The output signal thereby occurring is, a measure for the imbalance present and is indicated on an indicating instrument 41. For the automation of the balancing procedure this signal is fed as an actual value of a comparison stage 42, in which it is compared with a nominal value given from outside which represents the permissible residual imbalance. If the actual value is greater than the nominal value, the signal L goes to the machine and to an AND-gate 43. Insofar as the machine at this time has received bell control commands disturbing the balancing procedure, it supplies in each turn also the signal L to the gate 43 which thereupon likewise gives signal L. With this signal L via an OR-Gate 44 a flip-flop 45 is set, so that the coupling 32 is released and furthermore a flip-flop 46 is set. By the setting of the flip-flop 46 an AND-Gate 47 is prepared and via a dynamic OR-Gate 48 a further flip-flop 49 is set and delay members 50 and 51 are started. After the setting of the flip-flop 49 the AND-Gate 47 also gives the signal L, so that via an OR-Gate 52 operating voltage is supplied to the motor 34. The motor 34 then turns at maximum speed in an arbitrarily set direction of rotation, so that the total imbalance and thereby the output signal supplied by the detector 40 varies. If thereby the total imbalance diminishes, a differentiation state 53 supplies to a connected zero discriminator 54 negative voltage, so that this applies at the output signal O. Thereby the connected AND-Gate 55 supplies to two further AND-Gates 56 and 57 signal O, so that these two likewise show signal O at the output, so that the delay members 50 and 51 remain without effect and a further delay member 58 is not struck at all. By means of the short signal L from the gate 55 however via an OR-Gate 59 a flip-flop 60 is set so that a further AND-Gate 61 is now prepared.

The motor 34 runs further, until the total imbalance reaches a minimum, and then the differentiation stage 53 gives signal O to the zero discriminator 54 which then gives signal L, so that the AND-Gate 55 prepared by the set flip-flop 46 likewise gives signal L. Thereby flip-flop 49 is cancelled and a flip-flop 63 set, so that the coupling 32 is again engaged and the coupling 33 is released.

By signal L at the output from Gate 61 a delay member 64 is struck, and as soon as its time has run, flip-flop 60 is cancelled and the flip-flop 65 set, so that an AND-Gate 66 is prepared. Furthermore after expiring of the delay member 64 via a further AND-Gate 67 and/or gate 48 the flip-flop 49 is again set, so that the motor 34 is switched on again via the gates 47 and 52. As now the coupling 32 is engaged and the coupling 33 released, the angle position of the compensation imbalance is no longer altered, however the same procedures run as described at the beginning of the operation with release coupling 2, that is the delay members 50 and 51 are struck and the zero discriminator 54 gives a signal, according to whether and how the total imbalance of the machine varies.

It should now however be assumed that the arbitrarily adjusted direction of rotation of the motor 34 leads to an increase of the total imbalance, so that the differentiation member 53 applies positive signal to the zero discriminator 54 and this thereupon gives signal L. The gates 56 and 57 are thereby prepared, so that after running of the delay time of the time member 51 the gate 57 gives signal L. Thereby the flip-flop 49 is cancelled, so that the motor 34 stops and at the same time the signal goes to a direction of rotation reverse circuit (not shown) for the motor 34, so that its direction of rotation is switched over. At the same time a time member 68 starts which, after running of the delay time via the gate 48 again sets the flip-flop 49, so that via gates 47 and 52 the motor 34 is again switched on, now however with reverse direction of rotation. The total imbalance thereupon reduces again until the actual value fed to the comparison stage 42 falls short. The comparison stage 42 gives then signal O to the gate 43 so that the flip-flop 46 is no longer held set. If now after jumping of the zero discriminator 54 from signal O to signal L after running of the delay of the time member 64 the flip-flop 65 is set, the prepared AND-Gate 66 switches over to signal L, so that the flip-flop 46 and 63 are cancelled. The motor 34 is thus stopped, and at the same time the coupling 33 is again engaged.

If in the first stage of the balancing procedure, in which the position of the compensation balance is varied, a reversal of direction of rotation is necessary or no reversal of direction of rotation in the second stage is required, the drive procedures run correspondingly.

A few special cases however may occur in the output position of the apparatus.

The first of these special cases consists in that, at the commencement of the compensation procedure the compensation imbalance is exactly opposite the wheel imbalance. Independent of the direction of rotation then always an increase of the total imbalance results, so that the zero discriminator 54 applies in each case signal L. At the end of the time delay of time member 51 thereby in the described manner a reversal of direction of rotation of motor 34 is brought about, and then in the manner described the minimum is again located.

The same applies when at the commencement of the compensation procedure the compensation imbalance corresponds to the magnitude according to the wheel imbalance, that is by means of the time member 51 the compensation apparatus is driven sufficiently far from the compensation position in order then again to reach the exact minimum.

A further special case consists in that, at the commencement of the compensation procedure the part weights of the apparatus are approximately opposite, so that a position displacement results in no noticeable variation of the total imbalance. A zero discriminator 54 supplies therefore a continuous signal L, so that then in the described manner at the end of the delay time of the time member 51 the direction of rotation of the motor 34 is reversed. As however the output of the zero discriminator 54 is also then not altered, the AND-Gate 56 at the end of the delay time of the time member 50, which is greater than that of the time member 51, receives at all three inputs signal L and supplies therefore at this output likewise signal L. By means of this signal the flip-flop 49 is cancelled, so that the motor 34 remains stopped and via the gate 62 the flip-flop 45 is cancelled and the flip-flop 63 set, so that the coupling 33 is released and the coupling 32 engaged. In addition due to the signal L at the output of the gate 56 the time member 58 starts, so that the motor 34 via the gate 52 is again switched on, so that the amount of the compensation imbalance is varied. Thereby the output of the zero discriminator 54 varies the stage of the flip-flop 60 and the gate 61 as the OR-Gate 59 receives a long signal L from the time member 58.

After running of the time member 58 there appears at the left output of the time member 54 signal O, so that the motor 34 is switched off, and on the right output signal L occurs, so that via OR-Gates 44 and 69 the flip-flops 45 and 63 are again switched over. Via the signal L to the gate 48 the flip-flop 49 is again set, and thereby the normal balancing procedure already described above commences.

It has already been mentioned, that the AND-Gate 43 tells the whole balancing procedure to start only when a corresponding signal from the machine is given. Thereby the balancing procedure can be prevented during processing, that is when the grinding wheel 13 is in engagement with the workpiece. Thus for example in the path of the grinding spindle shaft a signal transmitter may be provided which tells the signal from the comparison stage 42 to pass only to the second output of the gate 43 when the grinding spindle shaft is at a distance greater than a given distance from the workpiece. Instead of this of course a relay may also be provided which responds as soon as the appropriate drive is excited when the grinding spindle shaft is driven to a workpiece; other possibilities might result due to the construction of the grinding spindle shaft and the control for this.

With the control shown in FIG. 7 the balancing procedure involves the fact that the motor 34 runs at constant speed. If with large adjustment path it is desired to allow the motor to run at different speeds according to approximation to the total imbalance minimum, the output voltage of the differentiation member 53 may be used to influence the speed of the motor 34 independent of the approximation to the minimum. Since the output voltage of the differentiation member 53 is used as a control magnitude for the speed of the motor 34, it may also be used, in the case of especially high speeds, as a nominal value for a speed regulation of the motor 34.

Figure 8:
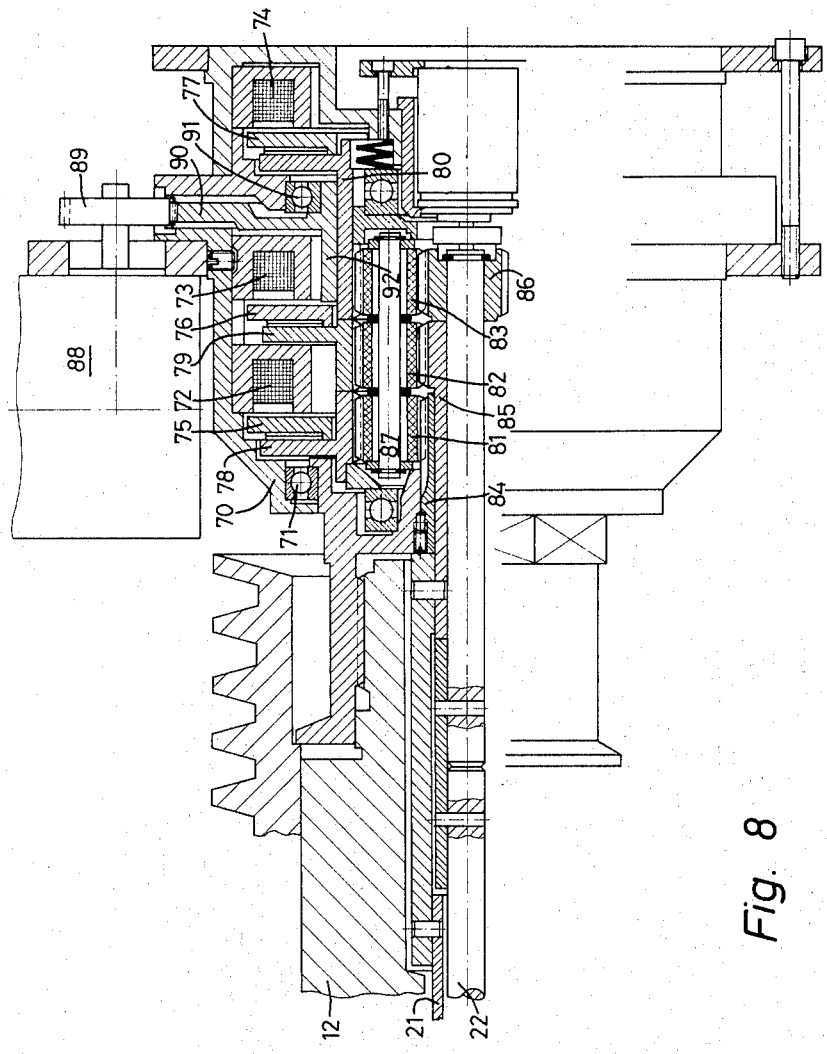
FIG. 8 shows a section through another embodiment of an operating part for the fine balancing device.

In the embodiment according to FIG. 8 the hollow shaft 21 with the solid shaft 22 located therein leads as in the case of FIG. 6 to the spindle 12 beyond the vee belt drive. Likewise, the end of the solid shaft 22 projects beyond the end of the hollow shaft 21. In this embodiment however a housing 70 is provided which is supported via a bearing 71 on the spindle 12, but is secured against rotation in a manner not shown. When the spindle 12 can carry out axial movements this rotation securing is so designed that the housing 70 can follow these axial movements. In this housing 70 are fixed three electromagnetic couplings 72, 73 and 74 which co-operate with corresponding coupling parts 75, 76 and 77 which are fixed rotationally on an adjusting ring 78, 79 and 80 respectively. These adjusting rings 78, 79, 80 have on the inner side toothed rims in which planet wheels such as 81, 82 and 83 respectively mesh. These planet wheels mesh in their turn in outer teeth, and in fact planet wheels such as 81 mesh in outer teeth 84 which belong to the spindle 12, planet wheels such as 82 in outer teeth 85 which belong to the hollow shaft 21, and planet wheels such as 83 to outer teeth 86 on the solid shaft 22. As shown, three planet wheels 81, 82 and 83 respectively are mounted on a common shaft 87 and can be used to drive other similar planet wheels on a similar shaft not shown.

The housing 70 carries an adjusting motor 88 with a pinion 89, which meshes with a gear 90 which in its turn at 91 is mounted rotatably in the housing 70. This gear 90 has a hub 92 which in the direction of the coupling part 76 projects beyond the electromagnetic coupling 73, so that upon excitation of the coupling 73 the coupling part 76 is coupled to this hub 92 and therefore upon excitation of the adjusting motor 88 and corresponding rotation of the pinion 89 and of the gear 90 is driven by the motor.

In this embodiment in the normal operation of the grinding machine all couplings 72, 73 and 74 are de-energized. The three adjusting rings 78, 79 and 80, which with plate springs are held together positively to form a pack are thereby dragged along by the frictional forces in the bearings of the adjusting rings and the planet wheels.

At the commencement of the balancing procedure the coupling 72 must be excited so that the adjusting ring 78 is braked; at the same time the coupling 73 is excited so that also the adjusting ring 79 on the flange 92 of the gear 90 is braked, which at this time is at rest. The adjusting ring 80 is then braked by friction on the adjusting ring 79, so that after a short time all three adjusting rings stop and only the planet wheels 81, 82 and 83 still rotate at a speed which depends on the selected teeth numbers, for example a third of the speed of rotation of the spindle.

If now the adjusting motor 88 is excited, it drives the pinion 89 the gear 90 and this takes along the adjusting ring 79, so that via planet wheels such as 82 the hollow shaft 21 is rotated relative to the spindle 12. By means of the positive locking adjusting ring 80 is taken along by the adjusting ring 79, so that the solid shaft 22 via planet wheel such as 83 is turned in the same direction and by the same amount as the hollow shaft 21 relative to the spindle 12. Thereby all five balance masses are turned in the same direction and by the same amount and this turning is continued until the balance moment of the balancing device is exactly opposite the imbalance of the grinding wheel 13, which is also the case in the embodiment according to FIG. 6.

If now the coupling 72 is de-energised and the coupling 74 excited, then the adjusting ring 80 is firmly braked on the housing 70 and with renewed excitation of the adjusting motor 88 and corresponding rotation of the adjusting ring 79 via the pinion 89 and the gear 90, is turned relatively to the adjusting ring 80 taking along the adjusting ring 78, so that the hollow shaft 21 and spindle 12 are turned relative to the solid shaft 22. The same effect however results as with the embodiment according to FIG. 6, namely the movable masses 25, 26 and 27 are turned with respect to the balance masses 18 and 19, masses 25 and 27 rotating relative to mass 26, so that the imbalance moment is partially compensated in the manner described until the balance moment of the grinding wheel 13 is also compensated by the magnitude of the balance moment of the balancing masses. As soon as this point is reached the adjusting motor 88 is again switched off and then the couplings 73 and 74 are de-energised so that the adjusting rings 78, 79 and 80 again rotate via the described positive locking taken along with the spindle 12 around the hollow shaft 21 and the solid shaft 22.

This control device may in the same manner as the device according to FIG. 6 be controlled with a circuit according to FIG. 7. The similar control means can easily be carried out by the expert; practically it is a question of commencing by exciting two of the three released couplings. As a second step one of these two couplings is released and the third is excited and as a third and final step the remaining excited couplings are released.

Figure 9:
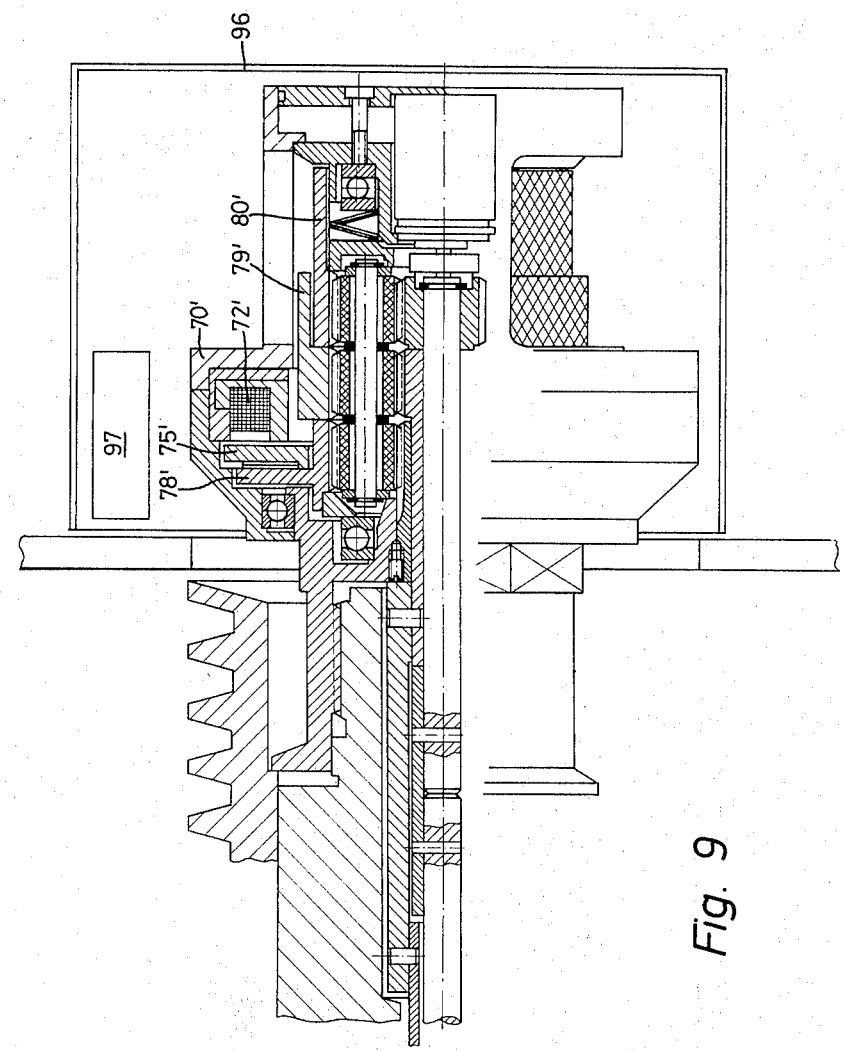
FIG. 9 shows a simplified embodiment of the operating part according to FIG. 8 for manual adjustment.

If a remote control of the balancing device is not necessary, the embodiment according to FIG. 8 may be simplified so that a manual operation is possible. Such simplified embodiment is illustrated in FIG. 9. Again a housing 70' is secured against rotation but as desired participation in axial movements is provided. This embodiment axial has a single electromagnetically excitable coupling 72' which co-operates with a coupling part 75' which is located on the adjusting ring 78'. Two adjusting rings 79' and 80' are not provided with couplings such as 76 and 77 but are axially extended so that they are accessible by hand. They may be milled on the outer faces with grooves or the like for more convenient hand operation as indicated in the lower part of FIG. 9.

At the commencement of the balancing procedure in the embodiment according to FIG. 9, the coupling 72' is excited so that as in the embodiment according to FIG. 8 the adjusting ring 78' is firmly braked. Then the adjusting ring 79' is turned by hand whereby it takes along the adjusting ring 80', then the adjusting ring 79' is firmly held by hand and the adjusting ring 80' rotated until in the manner described the balance moment of the grinding wheel 3 is compensated.

In normal operation of the embodiment according to FIG. 9 the adjusting rings 78', 79' and 80' rotate at spindle speed and in order to prevent these rotating parts in normal operation being inadvertently contacted, a protective covering 96 is provided which normally covers the whole control device. In order to ensure that the adjusting rings are eventually no longer rotated when the protective cover 96 is removed, the protective cover is provided with a switch device 97 which has a switch which lies in the excitation circuit of the coupling 72' and is closed when the protective covering 96 is hinged out of the position shown in FIG. 9. For this it may be a question of a simple end switch which, when the protective hood 96 is placed on, opens. There may also be provided a more expensive relay or a conductor circuit, particularly when it is feared that a simple end switch cannot safely switch the excitation current for the coupling 72'.

I claim:

1. Apparatus for the fine balancing of a grinding wheel mounted on a grinding wheel spindle with means for driving said spindle, said apparatus comprising two balance masses adjustable jointly in the same angular direction, and a third balance mass on opposite sides of which are disposed said first two balance masses, said third balance mass being adjustable in the opposite angular direction from said first two balance masses and having a balancing moment equal to the balancing moment of said first two balance masses combined, a common balance shaft rotatable relative to said grinding wheel, there being arranged on said balance shaft said first two and the third balance masses, a housing rotatable relative to said grinding wheel and said balance masses, said housing surrounding said balance masses and said balance shaft, at least one pinion gear journalled with respect to said housing, a first bevel gear rotatable with and secured to said third balance mass and meshing with said pinion gear, a second bevel gear rotatable with and secured to one of said jointly adjustable balance masses and also meshing with said pinion gear whereby, as the first and second balance masses rotate jointly about the axis of said common balance shaft, the third balance mass rotates in the opposite direction about the axis of the common balance shaft.

2. Apparatus according to claim 1, wherein the balance masses have substantially semi-circular cross section.

3. Apparatus according to claim 1, wherein the balance masses consist of a sintered hard metal of high specific weight.

4. Apparatus according to claim 1, including fourth and fifth balance masses which are arranged on the same axis as the first three balance masses and are located in and secured to said housing, and wherein said pinion gear is journalled in said fourth balance mass, the balance moment of said fourth balance mass together with said pinion gear being equal to the balance moment of said fifth balance mass.

5. Apparatus according to claim 4, wherein the balance moment of said fourth and said fifth balance masses together with the balance moment of said pinion gear is equal to the balance moment of said first three balance masses combined.

6. Apparatus according to claim 1, wherein
said grinding wheel spindle is hollow and said housing is disposed concentrically therein, said housing being concentrically disposed with respect to said balance shaft and surrounding said balance shaft and said balance masses, and
said apparatus further comprises
  a hollow shaft surrounding that portion of the balance shaft which projects from said housing, said hollow shaft being secured to and rotatable with said housing as an extension thereof, said hollow and said balance shafts extending beyond the spindle drive means, and said balance shaft extending beyond said hollow shaft, and
  a control device located at the ends of said balance and hollow shafts opposite the ends on which the balance masses are disposed, for adjusting said balance masses.

7. Apparatus according to claim 6, wherein said control device includes
  outer teeth on each of said spindle, said hollow shaft, and said balance shaft all of which have a common axis,
  at least one group of planet wheels disposed on at least one common shaft disposed parallel to said common axis, said planet wheels having teeth which mesh with the teeth on each of the spindle, hollow shaft, and balance shaft,
  adjusting rings concentric to said common axis and surrounding said group of planet wheels having inner teeth which mesh with said group of planet wheels, and
  a coupling device which, when activated, brakes one of said adjusting rings whereby the control device is freely rotatable with the jointly rotating spindle, the hollow shaft, and the balance shaft until said coupling means is activated.

8. Apparatus according to claim 7, including a protective hood which covers said control device wherein said coupling device is electromagnetically actuated by an excitation circuit having a switch which closes upon opening of the protective hood for manual operation.

9. Apparatus according to claim 7 further comprising two additional electromagnetically actuated coupling devices each of which cooperates with a coupling part on the two remaining adjusting rings, said two remaining adjusting rings being rotatably interconnected to said hollow shaft and said balance shaft through two of said planet wheels, and the ends of said two remaining adjusting rings normally being in frictionally abutting relation with each other for joint rotation,
an adjusting gear rotatably mounted on the spindle axis and located between the coupling parts of said two remaining adjusting rings and their associated electromagnetic couplings, said adjusting gear forming at its center a hollow cylindrical hub which axially extends slightly beyond the electromagnetically actuated coupling which is geared through one of the planet wheels to the hollow shaft,
an adjusting motor which drives a pinion gear that meshes with said adjusting gear whereby said hub on said adjusting gear frictionally engages the coupling part of the adjusting ring geared to the hollow shaft when the associated electromagnetic coupling is excited and the ends of the two remaining adjusting rings frictionally abut each other and rotate jointly when driven by the adjusting motor through the pinion and adjusting gears unless the electromagnetic coupling associated with the balance shaft is excited.

10. Apparatus according to claim 6, wherein the control device comprises
two couplings which in the coupled state independently couple said hollow shaft to said spindle and said balance shaft to said hollow shaft, said two couplings being electromagnetically activated by an external means, and
an adjusting motor for rotating the balance means having a drive shaft rotatably connected to the end of said balance shaft whereby, when the adjusting motor is activated, the balance masses are either rotated together or relative to each other depending on which coupling is activated.

11. Apparatus according to claim 6, wherein said apparatus further comprises
an oscillation receiver for indication of an imbalance,
a generator for producing an alternating voltage corresponding to the speed of the spindle,
a phase-sensitive detector circuit, and,
an automatic control means, said phase-sensitive detector circuit being connected to said automatic control means.

12. Apparatus according to claim 11, wherein said automatic control means includes
a comparison stage to compare the output signal of the phase detector with a nominal value and to supply a switch-on signal for the adjusting motor and at least one of the couplings so long as the output signal is greater than the nominal value, and
a differential stage to produce a signal corresponding to the ratio of change of the output signal, the output of said stage being connected to a bistable switch circuit which at a positive charge ratio generates a signal to reverse the direction of rotation of the adjusting motor.

13. Apparatus according to claim 12, wherein a zero discriminator is connected to said differentiation stage, said zero discriminator being adapted to supply a signal to a bistable switching means upon occurrence of a variation ratio zero of the detector output signal, said switching means being connected to said coupling means for switching the couplings to another state whereby as one coupling is energized and another coupling is de-energized when the bistable switching means receives a signal from the zero discriminator.

14. Apparatus according to claim 13, wherein the comparison stage, when equality of the voltage product with the nominal value is achieved, supplies a signal opposite to the switch-on signal to the bistable circuit so that each coupling that has been switched on is again switched off.

* * * * *